US009460598B2

(12) United States Patent
Noone et al.

(10) Patent No.: US 9,460,598 B2
(45) Date of Patent: Oct. 4, 2016

(54) FACIAL RECOGNITION IN CONTROLLED ACCESS AREAS UTILIZING ELECTRONIC ARTICLE SURVEILLANCE (EAS) SYSTEM

(71) Applicants: David R. Noone, Delray Beach, FL (US); Adam S. Bergman, Boca Raton, FL (US)

(72) Inventors: David R. Noone, Delray Beach, FL (US); Adam S. Bergman, Boca Raton, FL (US)

(73) Assignee: Tyco Fire & Security GmbH, Neuhausen Rheinfall (CH)

( * ) Notice: Subject to any disclaimer, the term of this patent is extended or adjusted under 35 U.S.C. 154(b) by 407 days.

(21) Appl. No.: 13/785,029

(22) Filed: Mar. 5, 2013

(65) Prior Publication Data

US 2014/0253706 A1 Sep. 11, 2014

(51) Int. Cl.

| | |
|---|---|
| ***H04N 7/18*** | (2006.01) |
| ***G08B 13/00*** | (2006.01) |
| ***G08B 21/00*** | (2006.01) |
| ***G06K 5/00*** | (2006.01) |
| ***G08B 13/24*** | (2006.01) |
| ***G08B 13/196*** | (2006.01) |
| ***G07C 9/00*** | (2006.01) |

(52) U.S. Cl.
CPC ......... *G08B 13/248* (2013.01); *G07C 9/00158* (2013.01); *G08B 13/19697* (2013.01)

(58) Field of Classification Search
CPC ...... H04N 7/18; G08B 13/00; G08B 13/248; G08B 21/00; G08B 13/22; G06K 5/00
See application file for complete search history.

(56) References Cited

U.S. PATENT DOCUMENTS

| | | | | |
|---|---|---|---|---|
| 2006/0267770 | A1 | 11/2006 | Sanari | |
| 2007/0252001 | A1* | 11/2007 | Kail et al. | 235/380 |
| 2008/0284593 | A1 | 11/2008 | Soto | |
| 2010/0070785 | A1 | 3/2010 | Fallin | |
| 2010/0176947 | A1 | 7/2010 | Hall | |
| 2010/0238286 | A1* | 9/2010 | Boghossian et al. | 348/143 |
| 2012/0112918 | A1* | 5/2012 | Dinh et al. | 340/600 |
| 2012/0307051 | A1* | 12/2012 | Welter | G08B 13/2482 348/143 |

FOREIGN PATENT DOCUMENTS

| | | | |
|---|---|---|---|
| EP | 1632919 | A2 | 3/2006 |
| WO | 20040034347 | A1 | 4/2004 |
| WO | 2012166211 | A1 | 12/2012 |

* cited by examiner

*Primary Examiner* — Sath V Perungavoor
*Assistant Examiner* — Patricia I Young
(74) *Attorney, Agent, or Firm* — Fox Rothschild LLP; Robert J. Sacco; Carol E. Thorstad-Forsyth

(57) ABSTRACT

Method for performing electronic article surveillance includes generating image data using at least one imaging device. The image data is processed in a computer processing device associated with an electronic article surveillance (EAS) pedestal to recognize the presence of a facial image. Based on such processing, data representative of the facial image is selectively communicated to a server at a location remote from the EAS pedestal. Subsequently, a notification is received from the server. The notification is based on an identification analysis involving actions performed at the server to identify a particular person using the facial image data. Thereafter, at least one EAS operation is selectively controlled at the EAS pedestal based on a content of the notification.

19 Claims, 7 Drawing Sheets

FACIAL RECOGNITION IN CONTROLLED ACCESS AREAS UTILIZING ELECTRONIC ARTICLE SURVEILLANCE (EAS) SYSTEM

BACKGROUND OF THE INVENTION

1. Statement of the Technical Field

The inventive arrangements relate to methods and systems for facial recognition and more particularly to improved methods and systems for facial recognition in areas which utilize electronic article surveillance (EAS) systems.

2. Description of the Related Art

Electronic article surveillance (EAS) systems can include imaging devices to provide enhanced performance. For example, International Publication No. WO 2004/034347 discloses a system in which video surveillance is used with an EAS system. An EAS system incorporating video sensors is also described in U.S. Pat. No. 7,961,096. In that system, a video analysis process is used in combination with the EAS system. The video analysis process is capable of detecting the presence, location and motion of objects. To this end, it is disclosed that the video sensors can be positioned overhead of a pair of EAS pedestals or can be integrated directly into the pedestals (e.g. on top of a pedestal).

In certain RFID tag systems a trigger event (e.g. an RFID tag detection) can be used to determine when image media is captured or processed. For example, U.S. Publication No. 2012/0056722 discloses an RFID system in which a trigger event can automatically trigger certain processing, such as facial recognition processing. When an RFID badge is detected the system can automatically perform facial recognition to determine whether the face of a person in a captured image matches the person associated with the tagged badge ID.

SUMMARY OF THE INVENTION

Embodiments of the invention concern a method for performing electronic article surveillance. The method includes generating image data using at least one imaging device. The image data is processed in a computer processing device associated with an electronic article surveillance (EAS) pedestal to recognize the presence (or absence) of a facial image. Based on such processing, data representative of the facial image is selectively communicated to a server at a location remote from the EAS pedestal. Subsequently, a notification is received from the server. The notification is based on an identification analysis involving actions performed at the server to identify a particular person using the facial image data. Thereafter, at least one EAS operation is selectively controlled at the EAS pedestal based on a content of the notification.

The invention also concerns an EAS system which includes at least one imaging device arranged to generate image data. A computer processing device is associated with an EAS pedestal, and is configured to receive the image data. The computer processing device is configured to process the data so as to recognize the presence (or absence) of a facial image that may be present within the image data. The EAS system also includes a communication interface operating under the control of the computer processing device. The communication device is configured to communicate data representative of the facial image to a server (which is provided at a location remote from the EAS pedestal). The communication interface is controlled by the computer processing device so as to transmit such communication responsive to a determination that a facial image has been recognized. The communication interface is also configured to receive from the server a notification based on certain identification analysis actions performed at the server. These identification analysis actions involve steps to identify a particular person based on the facial image data. The computer processing device is configured to selectively control at least one EAS operation at the EAS pedestal based on a content of the notification.

BRIEF DESCRIPTION OF THE DRAWINGS

Embodiments will be described with reference to the following drawing figures, in which like numerals represent like items throughout the figures, and in which.

DETAILED DESCRIPTION

Figure 1:
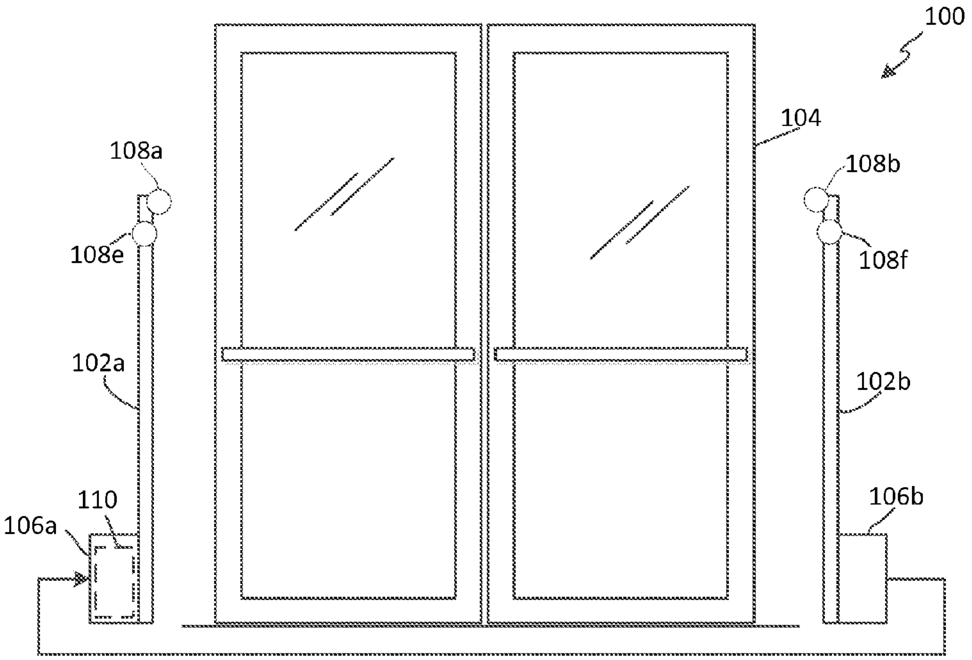
FIG. 1 is a side view of an EAS detection system, which is useful for understanding the invention.

The invention is described with reference to the attached figures. The figures are not drawn to scale and they are provided merely to illustrate the instant invention. Several aspects of the invention are described below with reference to example applications for illustration. It should be understood that numerous specific details, relationships, and methods are set forth to provide a full understanding of the invention. One having ordinary skill in the relevant art, however, will readily recognize that the invention can be practiced without one or more of the specific details or with other methods. In other instances, well-known structures or operation are not shown in detail to avoid obscuring the invention. The invention is not limited by the illustrated ordering of acts or events, as some acts may occur in different orders and/or concurrently with other acts or events. Furthermore, not all illustrated acts or events are required to implement a methodology in accordance with the invention.

Conventional EAS systems can include video-based object recognition capability. For example, U.S. Pat. No. 7,961,096 discloses that such object recognition capability can allow classification of objects including shopping carts, wheelchairs, strollers , shopping bags and even human forms. However, the operation of an EAS system can be improved by including advanced facial recognition processing capability within such systems. For example, an EAS system can be improved by facilitating identification of individuals by comparison of their facial features to known biometric models which are stored in a database. In such a scenario, an EAS function can be selectively varied based on a specific identification of an individual as contained in such a database.

Still, there are significant challenges associated with the implementation of an EAS system that provides individual person identification based on facial recognition. One such problem involves management of communication bandwidth. A retail store environment can have numerous entries and exits, and each such entry or exit will generally be monitored by one or more EAS sensing device. To fully integrate facial recognition with the EAS system, one or more imaging devices (e.g. video cameras) are needed to monitor a volume of space associated with each EAS sensing device. At a minimum, at least one imaging device or video camera will be needed for each entry/exit that that is to be monitored at the facility.

Notably, facial recognition and identification requires significant processing and database resources. Accordingly, it is advantageous to perform such identification processing at a single centralized location at the facility or elsewhere. But centralized processing of images to discern facial images and facilitate actual identification of individuals based on such images can require continuous communication of streaming video image data from each camera location to the central server. Once this video data is received, the centralized server must process each video stream to identify human faces, select one or more facial images containing an image of a person's face, and then analyze the images to facilitate identification of that person. A key limitation in such a system is the substantial communication bandwidth required to transmit video data from all of the various imaging device to the centralized server facility. The bandwidth problem is particularly acute in those scenarios where the video image data is communicated wirelessly from the video imagers to the central server which performs facial identification processing.

In order to overcome the above-described problems there is disclosed herein a method for performing electronic article surveillance which is enhanced by means of facial recognition. More particularly, electronic article surveillance is enhanced by identifying persons in an EAS surveillance zone by using a facial recognition algorithm. With this approach, the communication bandwidth problem is solved by performing selected facial recognition processing at the EAS pedestal. Once a facial image is discerned within a video image, the image can be communicated to a central server. The image data (i.e., data representing a facial image which has been detected) can be automatically communicated once a face is detected, or can be selectively communicated based on certain EAS criteria as determined by an EAS pedestal. For example, in some scenarios, the image can be communicated only when an EAS tag is detected within an EAS detection zone.

An embodiment of the invention involves sensing at least one parameter at an EAS pedestal to detect a presence of an EAS tag. Concurrently with such sensing, image data is generated at the EAS pedestal using one or more imaging devices. The imaging device(s) are mounted in a suitable location for observing an EAS sensing area. For example, one or more imaging devices can be mounted on the EAS pedestals which are used to monitor a particular entry or exit of a facility. The image data is processed in a computer processing device located at the EAS pedestal. The processing is performed to as to facilitate recognition of a facial image (comprising a face of a person) within the image data being generated by the one or more imaging devices. Thereafter, as a result of such processing, data representative of a facial image is communicated (in all cases or selectively) to a server at a location remote from the first EAS pedestal. Additional actions can also be performed at the EAS terminal responsive to the aforementioned processing to facilitate operations of the EAS terminal.

Figure 3:
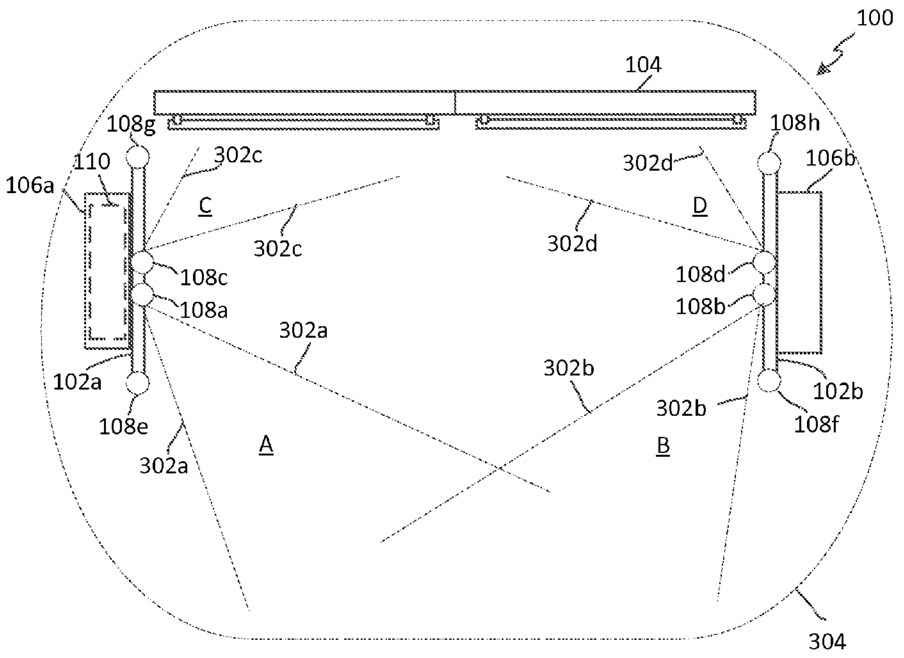
FIG. 3 is a top view of the EAS detection system in FIG. 1, which is useful for understanding a EAS detection zone and a camera field of view.
Figure 4:
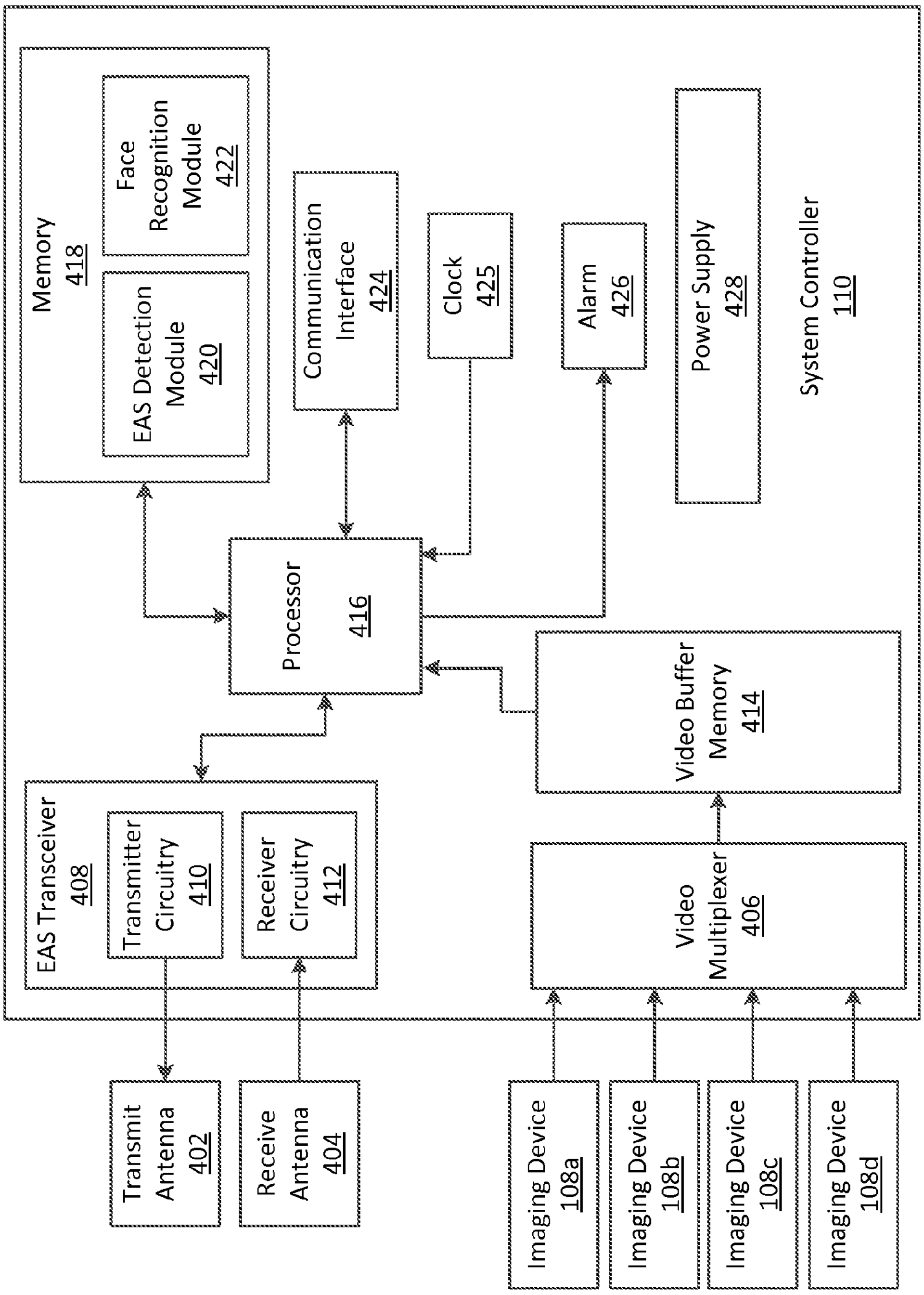
FIG. 4 is a block diagram that is useful for understanding an arrangement of an EAS controller which is used in the EAS detection system of FIGS. 1 and 2.

Referring now to the drawings figures in which like reference designators refer to like elements, there is shown in FIGS. 1, 3, and 4 an exemplary EAS detection system 100. The EAS detection system will be positioned at a location adjacent to an entry/exit 104 of a secured facility. The EAS system 100 uses specially designed tags (not shown) which are applied to store merchandise or other items which are stored within a secured facility. The tags can be deactivated or removed by authorized personnel at the secure facility. For example, in a retail environment, the tags could be removed by store employees. When an active tag is detected by the EAS detection system 100 in an EAS detection zone 304 near the entry/exit, the EAS detection system will detect the presence of such tag and will sound an alarm or generate some other suitable EAS response. Accordingly, the EAS detection system 100 is arranged for detecting and preventing the unauthorized removal of articles or products from controlled areas.

A number of different types of EAS detection schemes are well known in the art. For example known types of EAS detection schemes can include magnetic systems, acousto-magnetic systems, radio-frequency type systems and microwave systems. For purposes of describing the inventive arrangements in FIGS. 1, 3, and 4, it shall be assumed that the EAS detection system 100 is an acousto-magnetic type system. Still, it should be understood that the invention is not limited in this regard and other types of EAS detection methods can also be used with the present invention.

The EAS detection system 100 includes a pair of pedestals 102*a*, 102*b*, which are located a known distance apart at opposing sides of entry/exit 104. The pedestals 102*a*, 102*b* are stabilized and supported by a base 106*a*, 106*b*. Pedestals 102*a*, 102*b* will generally include an antenna suitable for aiding in the detection of the special EAS tags as described herein. For example, pedestal 102*a* can include a transmit antenna 402 and pedestal 102*b* can include an EAS receive antenna 404 as shown in FIG. 4. The antennas located in the pedestals 102*a*, 102*b* are electrically coupled to a system controller 110, which controls the operation of the EAS detection system to perform EAS functions as described herein. In some embodiments of the invention, a single pedestal 102*a* can be used for the EAS detection system 100 instead of two pedestals shown. In such embodiments, a single antenna can be provided in the pedestal 102*a*. The single antenna is configured for transmitting an exciter signal for the EAS tags and for detecting the response of such EAS tags. The single antenna is selectively coupled to the EAS receiver and the EAS transmitter in a time multiplexed manner so as to facilitate each function.

Figure 2:
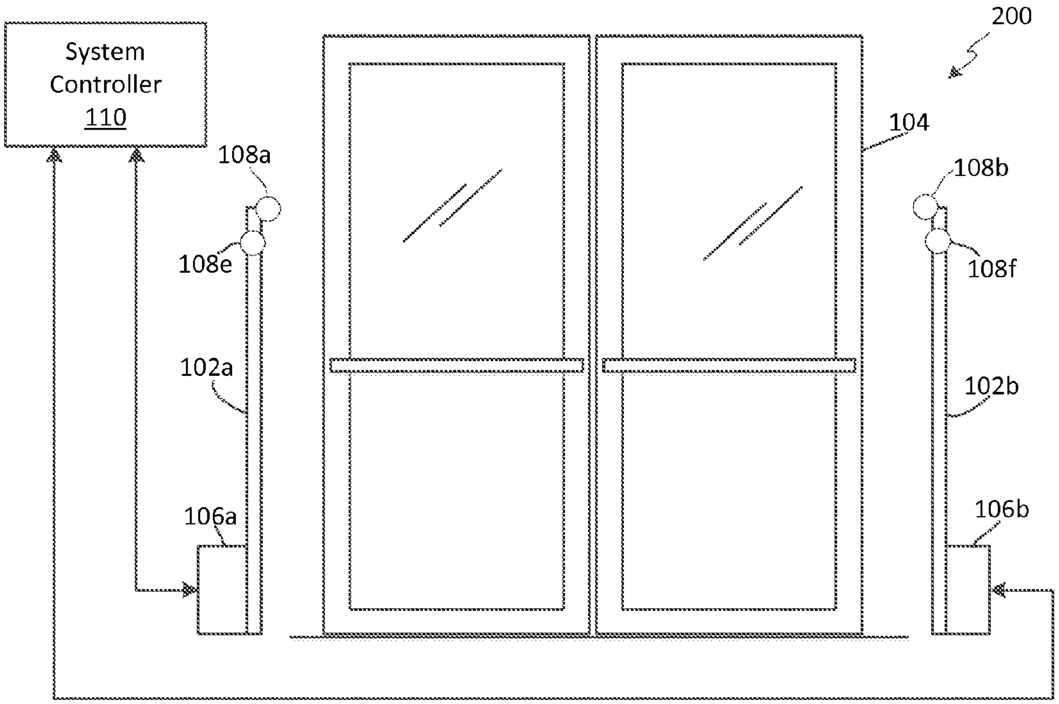
FIG. 2 is a side view of an alternative embodiment of the EAS detection system in FIG. 1.

The system controller can be located within a base of one of the pedestals as shown in FIG. 1. Alternatively, the system controller can be located within a separate chassis at a location within the immediate area surrounding the pedestals. For example, the system controller 110 can be located in a ceiling just above or adjacent to the pedestals. Such an arrangement is illustrated in FIG. 2, which shows an EAS detection system 200 in which the system controller in a housing separate from the pedestal, but still located in the same general area as the pedestal (e.g. within 5 to 50 feet.). For purposes of the present invention, a system controller will be deemed to be located at the EAS pedestal if it is located within the pedestal or is located within this distance. According to yet another embodiment, the functions of the system controller 110 can be distributed among processing elements (not shown) which are disposed in the pedestal (e.g. pedestal 102*a*) and in a separate chassis at a location within the immediate area surrounding the pedestal as described herein. A controller with distributed elements as described will also be deemed for purposes of this invention to be located at the EAS pedestal.

EAS detection systems are well known in the art and therefore will not be described here in detail. However, those skilled in the art will appreciate that a transmit antenna 402 of an acousto-magnetic type EAS detection system is used to generate stimulus signals. The stimulus signals cause a mechanical oscillation of a strip (e.g. a strip formed of a magnetostrictive, or ferromagnetic amorphous metal) contained in a tag within a detection zone 304. As a result of the stimulus signal, the tag will resonate and mechanically vibrate due to the effects of magnetostriction. This vibration will continue for a brief time after the stimulus signal is terminated. The vibration of the strip causes variations in its magnetic field, which can induce an AC signal in the receiver antenna. This induced signal is used to indicate a presence of the strip within the detection zone 304.

One or more imaging devices 108*a*, 108*b*, 108*c*, 108*d* are provided to capture images of the faces of people who are entering and/or leaving through the entry/exit 104. These imaging devices can be located in any suitable location, but are preferably located on the pedestals 102*a*, 102*b*. For example, the imaging devices 108*a*, 108*b*, 108*c*, 108*d* can be located at a top or upper portion of the pedestals 102*a*, 102*b* as shown in FIGS. 1-3. The imaging devices can be arranged for capturing images of persons entering or leaving the premises of the secured facility. Accordingly, imaging device 108*a*, 108*b* can be arranged to capture images of persons leaving the premises, whereas imaging devices 108*c*, 108*d* can be arranged to capture images of persons entering the premises. This concept is illustrated in FIG. 3, which shows that imaging device 108*a* will have a field of view "A" indicated by lines 302*a*, and imaging device 108*b* will have a field of view "B" indicated by lines 302*b*. Similarly, imaging device 108*c* will have a field of view "C" indicated by lines 302*c*, and imaging device 108*d* will have a field of view "D" indicated by lines 302*d*.

Additional imaging devices can be provided on the pedestals 102*a*, 102*b* without limitation. For example imaging devices 108*e*, 108*f*, and 108*g*, 108*h* can be provided respectively at the front and rear edges of the pedestals as shown in FIGS. 1 and 2. In order to avoid obscuring the invention, fields of view for the additional imaging devices are not shown. However, those skilled in the art will appreciate than the imaging devices 108*e*, 108*f*, 108*g*, 108*h* can have a field of view that is advantageous for obtaining facial image data. For example, the imaging devices 108*e*, 108*f*, 108*g*, 108*h* can each have a field of view which is chosen to capture facial image data of persons as they approach the EAS detection zone 304.

Referring now to FIG. 4, there is provided a block diagram that is useful for understanding the arrangement of the system controller 110. The system controller comprises a processor 416 (such as a central processing unit (CPU)), and can optionally include a dedicated video processing device (not shown) to facilitate image processing as described herein. The system controller also includes a computer readable storage medium, such as memory 418 on which is stored one or more sets of instructions (e.g., software code) configured to implement one or more of the methodologies, procedures or functions described herein. The instructions (i.e., computer software) can include an EAS detection module 420 to facilitate EAS detection and a face recognition module 422 to facilitate recognition of a human face contained within an image. These instructions can also reside, completely or at least partially, within the processor 416 during execution thereof.

The system also includes an EAS transceiver 408, including transmitter circuitry 410 and receiver circuitry 412. The transmitter circuitry is electrically coupled to transmit antenna 402 and the receiver circuitry 412 is electrically connected to receive antenna 404 as shown. As noted above, a single common antenna can be used in some embodiments of the invention for both receive and transmit operations. In such embodiments, a suitable multiplexing arrangement is provided to facilitate both receive and transmit operation.

The system controller 110 can also include one or more circuit components to facilitate the video processing actions as hereinafter described. As such, the system controller 110 can include a video multiplexer 406 for receiving and routing video streams from a plurality of video imaging devices 108*a*, 108*b*, 108*c*, and 108*d*. The system controller 110 can also include a video buffer memory coupled to the video multiplexer for storing and buffering video image data which is to be processed in the processor 416.

Additional components of the system controller 110 can include a communication interface 424 configured to facilitate wired and/or wireless communications from the system controller 110 to a remotely located EAS system server as hereinafter described. The system controller can also include a real-time clock, which is used for timing purposes, an alarm 426 (e.g. an audible alarm, a visual alarm, or both) which can be activated when a tag is detected within the EAS detection zone 304. A power supply 428 provides necessary electrical power to the various components of the system controller 110. The electrical connections from the power supply to the various system components are omitted in FIG. 4 so as to avoid obscuring the invention.

Figure 5:
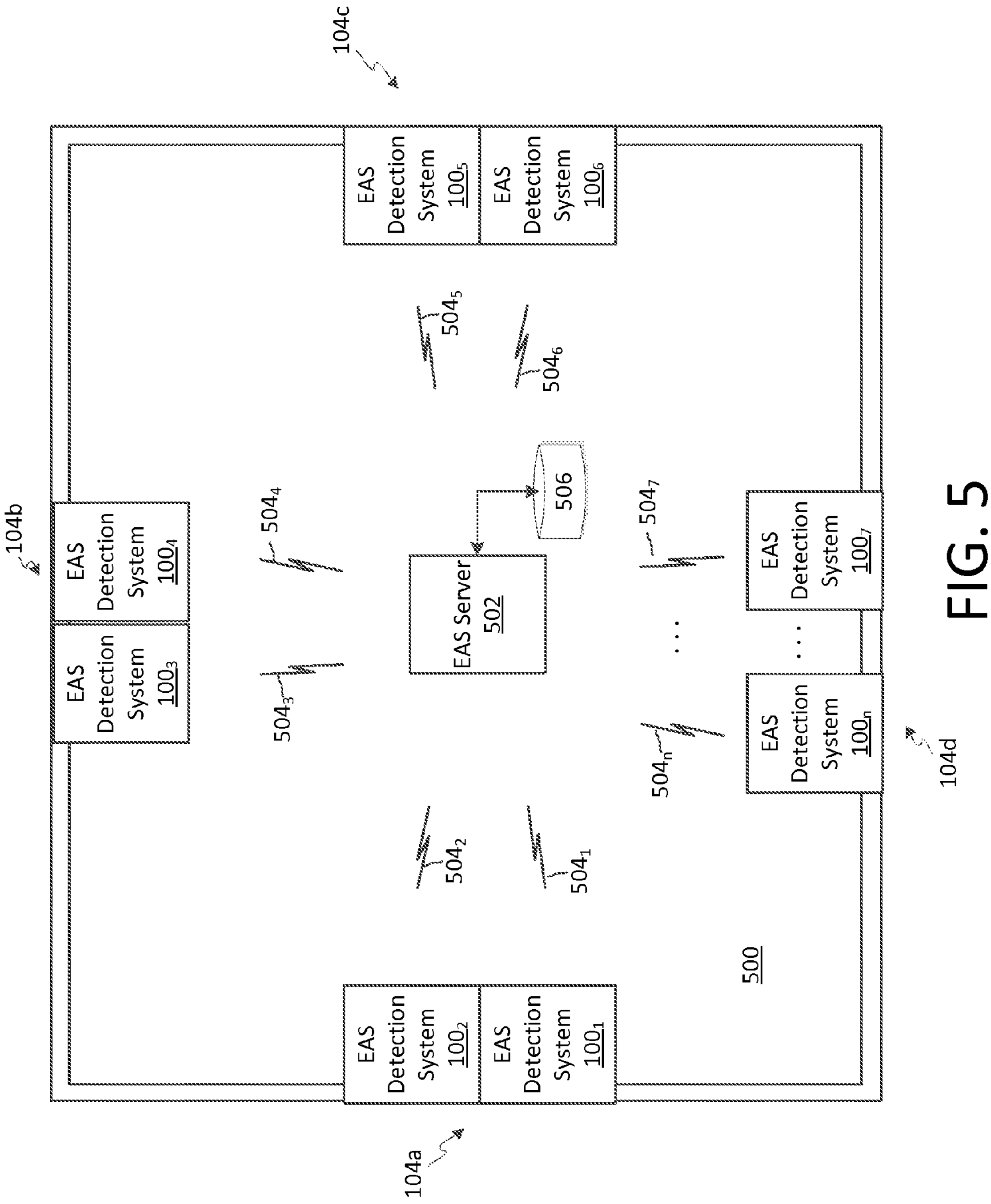
FIG. 5 is diagram that is useful for understanding how a plurality of EAS detection systems shown in FIG. 1 can be integrated into a secured facility which includes an EAS server.

Referring now to FIG. 5, there is provided a drawing of a secured facility 500 which has several points of entry/exit 104*a*, 104*b*, 104*c*, 104*d*. One or more EAS detection systems $\mathbf{100}_1$-$\mathbf{100}_n$ is provided at each point of entry/exit to prevent unauthorized removal of tagged items from the premises. Each EAS detection system $\mathbf{100}_1$-$\mathbf{100}_n$ is similar to the EAS detection system described herein with respect to FIGS. 1-4. The EAS detection systems $\mathbf{100}_1$-$\mathbf{100}_n$ each communicates with an EAS server 502 to coordinate EAS operations and facilitate operation of a facial identification system. For example such communications can be facilitated by means of a plurality of wired or wireless communication links $\mathbf{504}_1$-$\mathbf{504}_n$.

Figure 6:
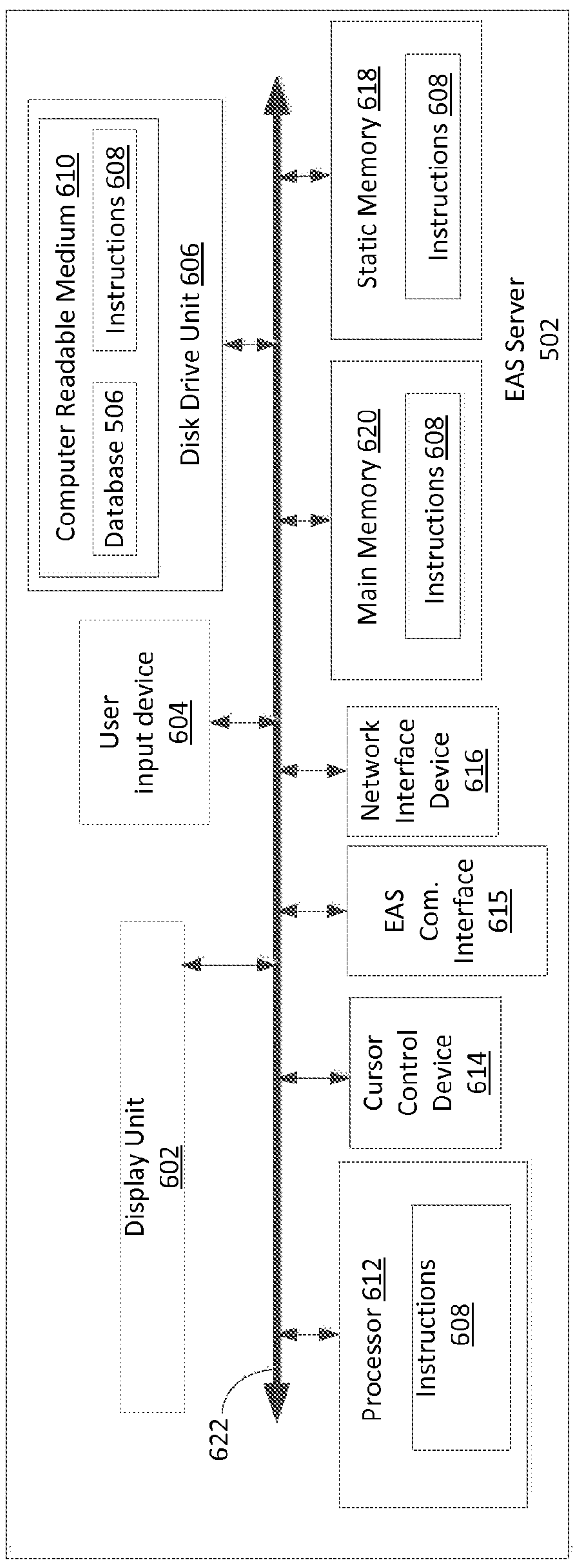
FIG. 6 is a block diagram that is useful for understanding an EAS server which can be used in the present invention.

A block diagram of the EAS server 502 is provided in FIG. 6. The EAS server 502 includes a processor 612 (such as a central processing unit (CPU), and can optionally include a separate dedicated video processing unit (not shown). The EAS server also includes a disk drive unit 606, a main memory 620 and a static memory 618, which communicate with each other via a bus 622. The server 502 can further include a display unit 602, such as a video display (e.g., a liquid crystal display or LCD), a flat panel, or a solid state display. The server 502 can also include a user input device 604 (e.g., a keyboard), a cursor control device 614 (e.g., a mouse) and a network interface device 616 for communicating with a computer network.

The disk drive unit 606 includes a computer-readable storage medium 610 on which is stored one or more sets of instructions 608 (e.g., software code) configured to implement one or more of the methodologies, procedures, or functions described herein. The instructions 608 can also reside, completely or at least partially, within the main memory 620, the static memory 618, and/or within the processor 612 during execution thereof by the computer system. The main memory 620 and the processor 612 also can constitute machine-readable media. A database 506 which is useful for facilitating certain facial identification processing as described herein can be stored on the disk drive unit 606 as shown in FIG. 6, or on a separate data storage medium accessible to the EAS server 502 as shown in FIG. 5.

Figure 7:
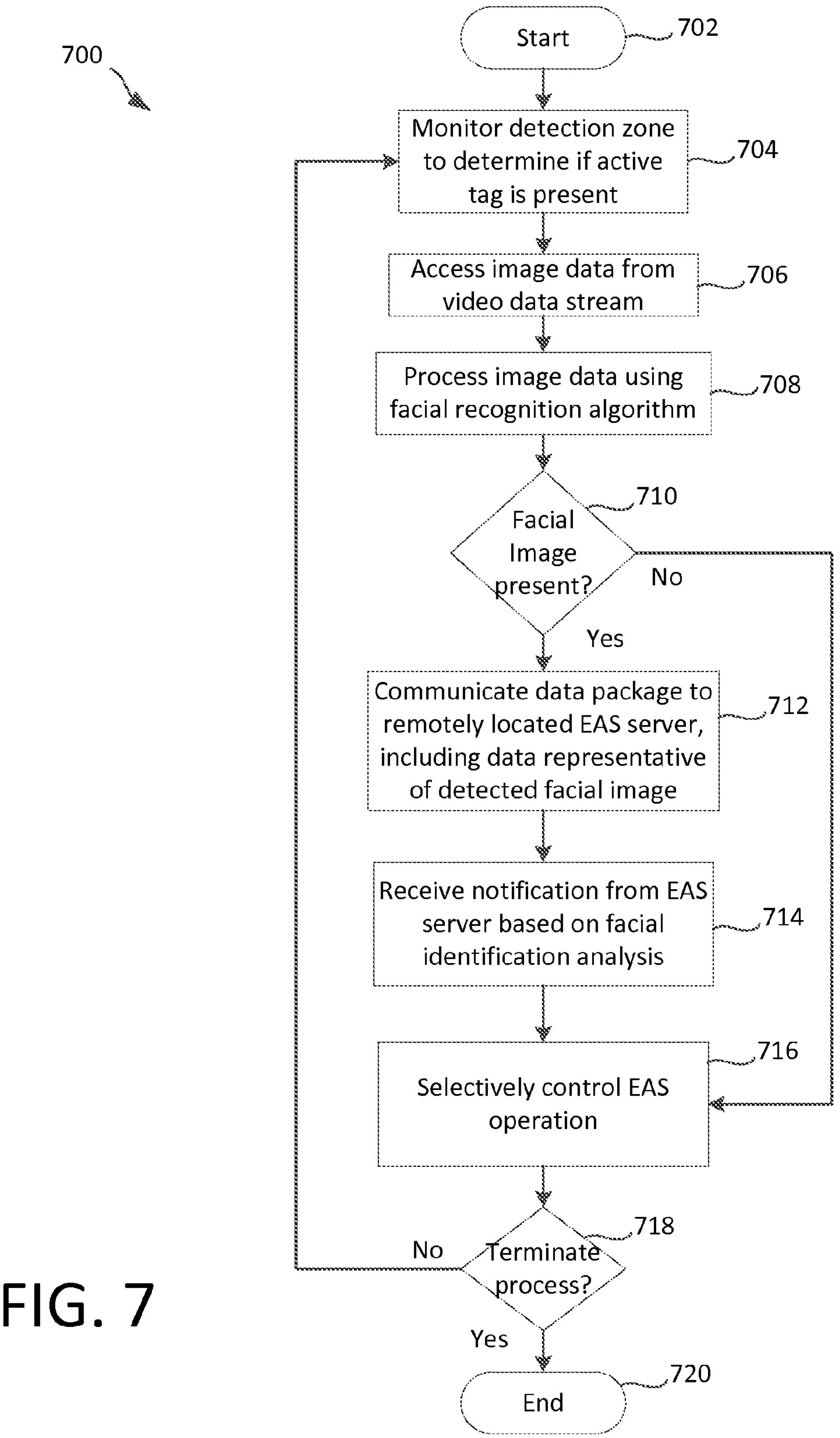
FIG. 7 is a flowchart that is useful for understanding and embodiment of the invention.

Referring now to FIG. 7 there is provided a flowchart 700 that is useful for understanding an embodiment of the invention. The process begins at 702 and continues at step 704 where a detection zone 304 is monitored to determine if an active EAS tag is present. Computer software included in EAS detection module 420 is advantageously used to facilitate EAS monitoring. The monitoring can be performed continuously, on a periodic basis, or in any other suitable manner as is known to those skilled in the art. The results of the monitoring can be temporarily stored in a memory of the system controller 110. For example, the EAS monitoring result can be stored in a memory 418 together with a time stamp which specifies a time when the active tag was detected. The time stamp can be determined based on a time value provided by clock 425.

In step 706, image data is accessed from a video data stream. For example, this step can involve accessing with processor 416 image data obtained from video buffer memory 414. The processor can select from image data generated by one or more of the imaging devices 108*a*-108*d*, and provided to the video buffer memory 414 through video multiplexer 406. The process continues in step 708 in which the processor 416 analyzes the image data using a facial recognition algorithm (e.g. a facial recognition module included with face recognition module 422). As a result of such analysis, the processor will determine at step 710 whether a facial image is present in an image represented by the image data. As used herein, the term “facial image” refers to an image which includes a face of person.

Figure 8:
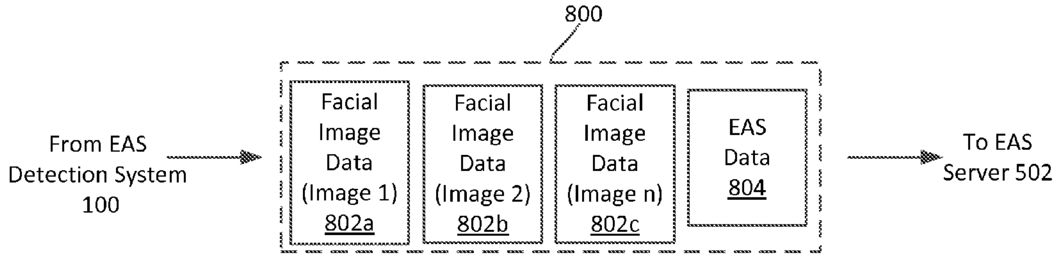
FIG. 8 is a diagram that is useful for understanding a data package that is communicated from an EAS detection system to an EAS server.

If no facial image is determined to be present in step 710, then the process continues directly on to step 716 where EAS operation is then controlled. However, if a facial image is found within the image, the processor generates a data package in a predetermined format which is to be communicated in step 712 to EAS server 502. This data package 800 is shown in FIG. 8 and includes at least facial image data file 802*a*. The facial image data file 802*a* will include data sufficient to allow the EAS server 502 to perform an identification of a person based on the facial image. In some embodiments, such data can be an original or compressed version of the actual image which may be processed by the EAS server 502 after receipt for identification of a person based on the unique features associated with that person’s face. A single image is generally comprised of a greatly reduced amount of data as compared to continuously streaming video. Accordingly, the extraction of a facial image from the video data stream at the EAS detection system 100 will greatly reduce the amount of data that must be communicated to the EAS server 502. Consequently, an amount of communication bandwidth needed for implementing the facial identification feature herein will be greatly reduced as compared to a system in which streaming video is communicated from the EAS pedestal to a central server 502.

In order to achieve a further reduction in required communication bandwidth, the data communicated to the EAS server 502 can be comprised of selected values which define certain biometric facial features. Such data can be extracted by the processor 416 based on the image data which has been captured. An advantage of extracting such facial feature information at processor 416 is that it can potentially further reduce the amount of data which must be communicated to the EAS server 502 as compared to communicating a compressed image file. The facial image data file 802*a* can also include a time stamp indicating when the image data was obtained, and information specifying which imaging device was the source of the image data.

Additional facial image data files (e.g. facial image data 802*b*, 802*c*) can also be generated at this stage of the process. The additional facial image data files can be generated in a manner similar to facial image data file 802*a*. It should be appreciated that facial image data files 802*b*, 802*c* can be based on additional images obtained from the same or from a different imaging device 108*a*, 108*b*, 108*c*, 108*d*. If the facial image data file is to include facial feature information which has been extracted from the image, such information can optionally be combined in a single facial image data set, in which mean or average values representing facial feature information is included. Such values can be obtained by processor 416 by processing feature information extracted from two or more images obtained by the same or different imaging device 108*a*-108*d*. The processed information can then be included in a single facial image data file which is communicated to the EAS server 502.

In an embodiment of the invention, data package 800 can also include an EAS data file which includes information relating to EAS monitoring performed in step 704. For example, the EAS data file can specify a particular EAS detection system $\mathbf{100}_1$-$\mathbf{100}_n$ from which the EAS data package 800 originated, whether or not an active tag has been determined to be present within an EAS detection zone, the time when such active tag has been identified and so on. Once the data package has been assembled as described herein, the data package is communicated to the EAS server 502 using a communication link (e.g. communication link $\mathbf{504}_1$-$\mathbf{504}_n$) as shown in FIG. 5.

When the data package 800 is received by the EAS server 502, the EAS server will perform facial identification processing using the facial image data contained therein. It should be appreciated that the facial identification processing performed at the EAS server 502 is different as compared to facial recognition processing performed at the system controller 110. The facial recognition processing performed at the system controller 110 generally involves a determination that a human face is present within an image, but does not involve any attempt to match that particular face to a particular person (e.g. using biometric information associated with the face of a particular person as stored in a database). In contrast, the facial identification processing performed at the EAS server 502 will involve processing which is intended to identify a particular person based on a comparison of biometric data extracted from the captured facial image to biometric models which are stored in a database (e.g. database 506). Notably, identification of a particular person does not necessarily involve determining personal information such as their name, but is instead a process of associating a captured facial image for that person to a biometric model for that person which was previously stored in the database. Accordingly, a person can be said to be "identified" as a known person even without knowledge of their name, or other non-biometric identifying information.

Facial identification processing is known in the art and therefore will not be described here in detail. However, those skilled in the art will appreciate that facial identification processing will involve processing performed by the EAS server to identify a particular person corresponding to the one or more facial image data files (e.g. facial image data files 802*a*, 802*b*, 802*c*) which have been received from the system controller 110. Any suitable facial identification process can be used for this purpose. For example, in an embodiment of the invention, the EAS server will compare facial feature information (based on the facial image data files) to facial feature information stored in a database 506 and corresponding to certain known persons. As a result of such processing, the EAS server will either identify a person or determine that the information contained in the facial image data file does not comprise a match to facial image data for any known person stored in its database 506. Those skilled in the art will appreciate that a biometric match as referenced herein need not be an actual exact match of biometric data stored in a database relative to biometric data extracted from a facial image. Instead, a biometric match can declared where the captured facial image satisfies a predetermined measure of similarity of facial features relative to a biometric model for a particular person. This sufficient level of similarity can be deemed to be a "match" for purposes of the present invention even though an exact match may not exist. This arrangement facilitates facial identification in scenarios where the biometric models stored in the database and/or the facial images collected do not perfectly represent facial features of a particular person.

Based on this determination, the EAS server will generate a notification and will communicate such notification to the system controller 110 of the particular one of the EAS detection system (100$_1$-100$_n$) that originally communicated the data package 800. The notification will be based on the results of the facial identification analysis performed by the EAS server and will be used by the system controller 110 to selectively control operation of the EAS detection system as hereinafter described. The notification sent to the system controller can be communicated using a suitable communication link (e.g. communication link 501$_1$-504$_n$).

When the notification is received from EAS server 502 at step 714, it is used by the system controller 110 at step 716 to selectively determine a behavior of the EAS detection system. The notification can be used in several different ways to influence the behavior of the EAS detection system. In one embodiment of the invention, the notification will indicate whether or not a particular person was identified as a result of the facial identification processing performed by the EAS server 502. Such a notification can be useful for identifying a person as a known (or suspected) shoplifter, or as a known valued customer. This information is then used by the system controller 110 to selectively control an EAS alarm in the case where an active tag is present. In such a scenario, the EAS alarm is selectively inhibited based on the result of the facial identification processing as indicated in the notification.

In order to understand the value of an EAS alarm inhibit feature as described herein, it should be noted that occasionally, an active EAS tag is detected within an EAS detection zone under circumstances where an EAS alarm response is not appropriate. For example, this can happen when a clerk fails to properly remove or deactivate an EAS tag, or environmental noise mimics a tag response. It can be desirable under such circumstances to prevent EAS alarms (which can be embarrassing to individuals and/or customers who cause the alarm to be triggered). Accordingly, the EAS alarm 426 can be enabled when the notification from the EAS server 502 specifies that the person identified in an image is a person who is listed in a database 506 of known or suspected shoplifters. If an active EAS tag is detected and the alarm 426 is enabled, then the alarm 426 will be caused to generate an audible and/or visual alarm. Conversely, the EAS alarm 426 can be disabled when notification from the EAS server indicates that the person who has been identified is a known and valued customer. Under such a scenario, an active EAS tag can be detected and yet an audible or visible EAS alarm will not result because the alarm is disabled. In step 718 a determination is made as to whether the process 700 should be terminated. If so (718: Yes), then the process terminates at step 720; otherwise the process continues at step 704.

Figure 9:
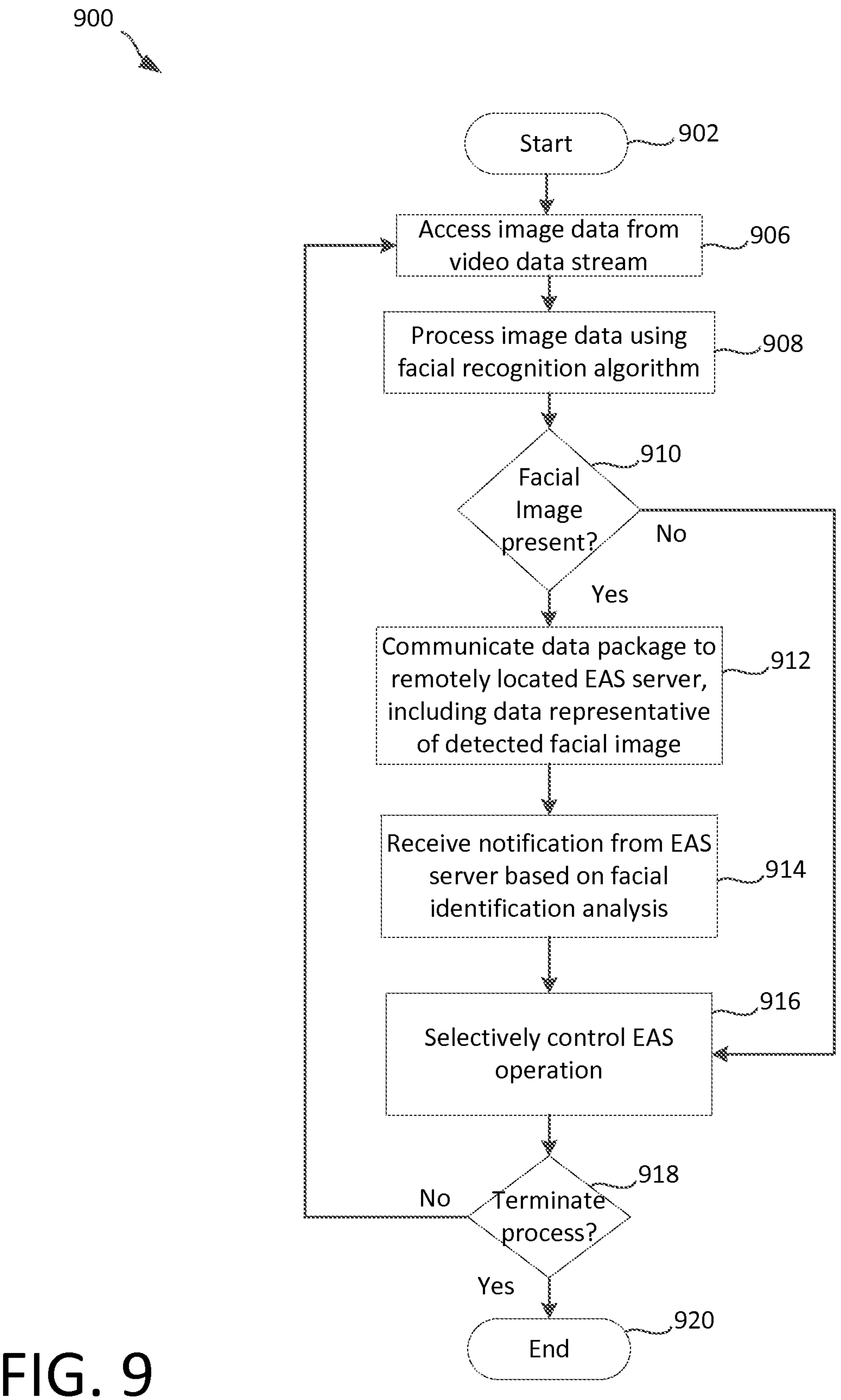
FIG. 9 is a flowchart that is useful for understanding alternative embodiment of the invention.

Referring now to FIG. 9, there is shown a flowchart 900 which is useful for understanding an alternative embodiment of the invention. The flowchart 900 is similar to the flowchart 700 except that in flowchart 900 a step corresponding to step 704 has been omitted. Steps 906-914 and 918 in flowchart 900 are similar to the steps 706-714 and 718 as described above in relation to flowchart 700. Accordingly, the description of steps 706-714 and 718 provided above is sufficient for understanding the corresponding steps in flowchart 900. However, in flowchart 900, step 916 can involve a broad range of actions designed to control the operation of the EAS detection system 100. In this embodiment, facial identification processing is used to activate, augment, or limit EAS related functions.

For example, according to one aspect of the invention, the receipt of the notification from EAS server in 914 is used at step 916 to selectively control an EAS power saving function. In such an embodiment, one or more circuits associated with the EAS transceiver 408 can normally be powered down or placed in a standby mode to reduce electrical power consumption. Similarly, processor operations relating to EAS detection can be suspended at processor 416. This standby or reduced power mode of operating can persist for the EAS transceiver 408 and processor 416 during certain times when the facial identification processing described herein is being performed. During such times, the power consumption of an EAS detection system 100 will be reduced while facial identification processing (steps 906-914) is performed for persons coming within view of the imaging devices 108*a*-108*d*.

When a notification is received at step 914 which indicates that a captured facial image corresponds to a person of interest, the selective control of EAS operation can involve activating one or more EAS components, such as EAS transceiver 408, EAS transmitter circuitry 410 and EAS receiver circuitry 412. Such a notification can also cause EAS detection processing to resume at processor 416. Consequently, the EAS system will be powered up or operate at full power only when the facial identification processing reveals that a particular facial image corresponds to a person of interest. In such an embodiment, a person of interest would be a person who is known or suspected of behaving in an unauthorized way (e.g. shoplifting).

The EAS detection system 100 could alternatively operate in the opposite manner, whereby the EAS transceiver 408 and EAS processing is fully active, but is powered down to a stand-by mode when the facial identification processing shows that a valued customer has been identified. In that case, when the notification received at step 914 indicates that a valued customer is in or approaching the EAS detection zone, then the EAS detection system can be powered down or placed in stand-by mode to save power, or avoid potential inappropriate EAS alarms.

Those skilled in the art will appreciate that accuracy of facial recognition systems is enhanced by obtaining good quality images that fully and accurately facilitate extraction of feature information. Still, it is desirable for a facial recognition system to remain unobtrusive. These competing requirements can create challenges with regard to camera placement. The problem is complicated by the need in many instances to have facial image data from two or more camera angles with respect to a target individual. This problem is solved in the present invention by placing imaging devices directly on the EAS pedestals. This placement positions the cameras at the optimum height for facial recognition software (approximately 60 inches) and directly in the path of pedestrian ingress and egress. The cameras and faces of target persons (typically pedestrians) are in a substantially parallel orientation to each other. This provides a more frontal view of the target individual's faces that is more suitable for facial identification as compared to the oblique camera angles which are prevalent when cameras are mounted at other locations. Imaging devices 108*a*-108*h* can be arranged to capture images of a person's face from a selection of viewing directions that are deemed optimal for facial image recognition and identification.

A significant advantage of the system and methods described herein concerns the reduction in bandwidth required for facilitating enhanced EAS operations. Facial recognition processing is performed using the control system 110 located at the EAS pedestal. Conversely, facial identification processing is performed for one or more EAS detection systems 100 at a remotely located EAS server. This approach reduces the need for expensive and substantial processing resources at the EAS pedestal 100, while minimizing system bandwidth requirements. Bandwidth requirements are reduced by eliminating the need for streaming video from numerous EAS pedestal locations to the central EAS server 502. The foregoing features facilitate integration of a facial identification feature into an EAS pedestal system with minimal additional expense.

The added capability of facial identification can be used in several different ways as described herein. Notably, the ability to actually identify individuals based on a facial image has significant advantages in an EAS system relative to simple facial recognition systems that merely recognize the presence of a face within an image. The facial identification function facilitates selective control of the EAS functions on the basis of actual person identity, rather than upon the mere recognition that a person is present within an image. These functions are facilitated while dramatically reducing the RF bandwidth which would otherwise be required for video streaming.

Those skilled in the art will appreciate that the system controller architecture illustrated in FIG. 4 and the EAS server architecture in FIG. 6 each represent one possible example of a system architecture that can be used with the present invention. However, the invention is not limited in this regard and any other suitable architecture can be used in each case without limitation. Dedicated hardware implementations including, but not limited to, application-specific integrated circuits, programmable logic arrays, and other hardware devices can likewise be constructed to implement the methods described herein. It will be appreciated that the apparatus and systems of various inventive embodiments broadly include a variety of electronic and computer systems. Some embodiments may implement functions in two or more specific interconnected hardware modules or devices with related control and data signals communicated between and through the modules, or as portions of an application-specific integrated circuit. Thus, the exemplary system is applicable to software, firmware, and hardware implementations.

Further reductions in communication bandwidth requirements can be effected by shifting additional processing responsibilities from the EAS server 502 to the EAS detection system 100. For example, in some embodiments of the invention, facial identification processing as described herein can be performed at system controller 110. In such embodiments, the database 506 is provided at the EAS server and can be accessed by system controller 110. In some embodiments, the database 506 can also be provided within memory 418. If facial identification processing is performed at system controller, then the face recognition module 422 can include software algorithms which facilitate facial identification processing. In such an embodiment, the EAS pedestal is selectively controlled based on the facial identification processing in a manner similar to that described herein with respect to steps 716 and 916 in FIGS. 7 and 9 respectively. However, the facial identification processing is not performed at the EAS server 502. The EAS server can be omitted in such a scenario, or it can serve as a central communication hub for updating the facial identification data which is contained within the database 506. For example, updated facial identification data can be communicated from the EAS server to each EAS detection system 100 using communication links $\mathbf{504}_1$-$\mathbf{504}_n$.

Although the invention has been illustrated and described with respect to one or more implementations, equivalent alterations and modifications will occur to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application. Thus, the breadth and scope of the present invention should not be limited by any of the above described embodiments. Rather, the scope of the invention should be defined in accordance with the following claims and their equivalents.

We claim:

1. A method for performing electronic article surveillance, comprising:

sensing at least one parameter at an Electronic Article Surveillance ("EAS") pedestal to detect a presence of an active EAS tag within an EAS detection zone;

concurrent with said sensing, generating image data at the EAS pedestal using at least one imaging device;

processing the image data in a computer processing device located at the EAS pedestal to determine whether a facial image comprising a face of a person is present within the image data;

selectively communicating data representative of the facial image from the computer processing device to a server at a location remote from the EAS pedestal based on the processing, only when the active EAS tag is detected within the EAS detection zone and a facial image is determined to be present within the image data;

receiving, at the EAS pedestal, a notification generated by the server based on results of an identification analysis performed at the server involving actions to identify a particular person who has the face shown in the facial image; and selectively controlling with said computer processing device at least one EAS operation at the EAS pedestal based on a content of the notification;

wherein the notification differentiates between a trusted customer and a likely shoplifter and the at least one EAS operation comprises preventing any apparent EAS alarm response of the EAS pedestal in the presence of the EAS tag when the notification indicates a trusted customer.

2. The method according to claim 1, wherein the at least one EAS operation comprises selectively controlling operation of one or more circuits comprising an EAS transceiver to reduce power consumption.

3. The method according to claim 2, wherein the at least one EAS operation to reduce power consumption comprises selectively transitioning the one or more circuits from an active state in which the EAS transceiver actively performs electronic article surveillance to a stand-by state involving reduced power consumption when the notification indicates the presence of a trusted customer.

4. The method according to claim 1, wherein the at least one EAS operation comprises performing a metal detection function.

5. The method according to claim 1, wherein the at least one EAS operation comprises at least one of selectively controlling an EAS detection zone, and reducing an EAS backfield detection depending on whether the notification indicates a trusted customer or a likely shoplifter.

6. The method according to claim 1, wherein the data representative of the facial image comprises digital data defining the facial image.

7. The method according to claim 1, wherein the data representative of the facial image is comprised of facial feature data extracted from the facial image.

8. The method according to claim 1, further comprising positioning the imaging device in or on the EAS pedestal.

9. The method according to claim 1, further comprising:

generating second image data using at least a second imaging device mounted in or on a second EAS pedestal, and separated from the EAS pedestal by a gap;

processing the second image data in the computer processing device to recognize the presence of a second facial image comprising the face of the person within the image data;

associating data representative of the second facial image with the data representative of the facial image;

communicating the data representative of the second facial image to the server.

10. An electronic article surveillance (EAS) system, comprising:

an EAS pedestal sensing at least one parameter to detect a presence of an active EAS tag within an EAS detection zone;

at least one imaging device at the EAS pedestal arranged to generate image data concurrent with said sensing performed by the EAS pedestal;

a computer processing device located at an EAS pedestal, said computer processing device configured to receive the image data and to determine whether a facial image comprising a face of a person is present within the image data;

a communication interface configured to communicate data representative of the facial image from the computer processing device to a server provided at a location remote from the EAS pedestal only when the active EAS tag is detected within the EAS detection zone and a facial image is determined to be present within the image data, and receive a notification generated by the server based on results of an identification analysis performed at the server involving actions to identify a particular person who has the face shown in said facial image;

wherein the computer processing device is configured to selectively control at least one EAS operation at the EAS pedestal based on a content of the notification; and wherein the notification differentiates between a trusted customer and a likely shoplifter, and the at least one EAS operation comprises preventing any apparent EAS alarm response of the EAS pedestal in the presence of the EAS tag when the notification indicates a trusted customer.

11. The EAS system according to claim 10, wherein the at least one EAS operation comprises selectively controlling operation of one or more circuits comprising an EAS transceiver to reduce power consumption.

12. The EAS system according to claim 11, wherein the computer processing device is configured to selectively transition the one or more circuits from an active state in which the EAS transceiver actively performs electronic article surveillance to a stand-by state involving reduced power consumption when the notification indicates the presence of a trusted customer.

13. The EAS system according to claim 10, wherein the at least one EAS operation comprises a metal detection function.

14. The EAS system according to claim 10, wherein the at least one EAS operation comprises at least one of controlling an EAS detection zone, and reducing an EAS backfield detection depending on whether the notification indicates a trusted customer or a likely shoplifter.

15. The EAS system according to claim 10, wherein the data representative of the facial image comprises digital data defining the facial image.

16. The EAS system according to claim 10, wherein the data representative of the facial image is comprised of facial feature data extracted from the facial image.

17. The EAS system according to claim 10, wherein the imaging device is located in or on the EAS pedestal.

18. The EAS system according to claim 10, further comprising:

generating second image data using at least a second imaging device mounted in or on a second EAS pedestal, and separated from the EAS pedestal by a gap;

processing the second image data in the computer processing device to recognize the presence of a second facial image comprising the face of the person within the image data;

associating data representative of the second facial image with the data representative of the facial image;

communicating the data representative of the second facial image to the server.

19. A method for performing electronic article surveillance, comprising:

sensing at least one parameter at an Electronic Article Surveillance ("EAS") system to detect a presence of an active EAS tag within an EAS detection zone;

concurrent with said sensing, generating image data using at least one imaging device located at the EAS pedestal;

processing the image data in a computer processing device located at the EAS pedestal to determine whether a facial image comprising a face of a person is present within the image data;

selectively communicating data representative of the facial image from the computer processing device to a server at a location remote from the EAS pedestal based on the processing, only when the active EAS tag is detected within the EAS detection zone and a facial image is determined to be present within the image data;

performing at said server an identification analysis involving actions to identify a particular person who has the face shown in the facial image;

communicating from said server to said computer processing device a notification that was generated based on results of said identification analysis; and selectively controlling with said computer processing device at least one EAS operation at the EAS pedestal based on a content of the notification;

wherein the notification differentiates between a trusted customer and a likely shoplifter, and the at least one EAS operation comprises preventing any apparent EAS alarm response of the EAS pedestal in the presence of the EAS tag when the notification indicates a trusted customer.

* * * * *